United States Patent
Ohhashi

(10) Patent No.: US 10,521,254 B2
(45) Date of Patent: Dec. 31, 2019

(54) INFORMATION PROCESSING SYSTEM, COMPUTER PROGRAM PRODUCT, AND INFORMATION PROCESSING METHOD

(71) Applicant: RICOH COMPANY, LTD., Tokyo (JP)

(72) Inventor: Hideki Ohhashi, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 525 days.

(21) Appl. No.: 14/726,833

(22) Filed: Jun. 1, 2015

(65) Prior Publication Data

US 2015/0355918 A1    Dec. 10, 2015

(30) Foreign Application Priority Data

Jun. 5, 2014    (JP) .................. 2014-117107

(51) Int. Cl.
*G06F 9/455* (2018.01)
(52) U.S. Cl.
CPC ................ *G06F 9/455* (2013.01)
(58) Field of Classification Search
CPC ........................................ G06F 9/455
USPC ..................................... 703/24, 27
See application file for complete search history.

(56) References Cited

U.S. PATENT DOCUMENTS

2011/0022377 A1\* 1/2011 Han ................. G06F 9/455
                                                        703/27
2012/0311189 A1\* 12/2012 Yamada ............ G06F 21/6272
                                                        709/248
2014/0052986 A1\* 2/2014 Kanai ................. H04L 63/0428
                                                        713/168
2014/0052993 A1\* 2/2014 Isozaki ............... H04L 63/0428
                                                        713/175

(Continued)

FOREIGN PATENT DOCUMENTS

JP        9-198279 A     7/1997
JP     2007-226695 A     9/2007

(Continued)

OTHER PUBLICATIONS

Japanese Office Action dated Apr. 24, 2018 in Japanese Patent Application No. 2014-117107.

*Primary Examiner* — Andre Pierre Louis
(74) *Attorney, Agent, or Firm* — Xsensus LLP

(57) ABSTRACT

An information processing system includes: an information processing apparatus including: a shared operation unit that performs verification of operation of inter-model common processing common to multiple models out of processes of an application with a first program for realizing operation common to the models, and sends a result of the operation verification to the application; a processing requesting unit that requests an external device to perform verification of operation of model-dependent processing specific to each model with a second program for realizing operation specific to each model; and an acquiring unit that acquires a result of the verification of operation of model-dependent processing from the external device, and sends the result to the application, and external devices that perform verification of operation of model-dependent processing specific to each model out of the processes of the application with the second program for realizing operation specific to each model.

15 Claims, 13 Drawing Sheets

(56) References Cited

U.S. PATENT DOCUMENTS

2014/0082581 A1    3/2014   Ohhashi
2014/0359631 A1   12/2014   Ohhashi et al.
2015/0081268 A1    3/2015   Ohhashi et al.

FOREIGN PATENT DOCUMENTS

| JP | 2010-191578 A | 9/2010 |
| JP | 2011-22637 A | 2/2011 |
| JP | 2011-044127 | 3/2011 |
| JP | 2011-65213 A | 3/2011 |

\* cited by examiner

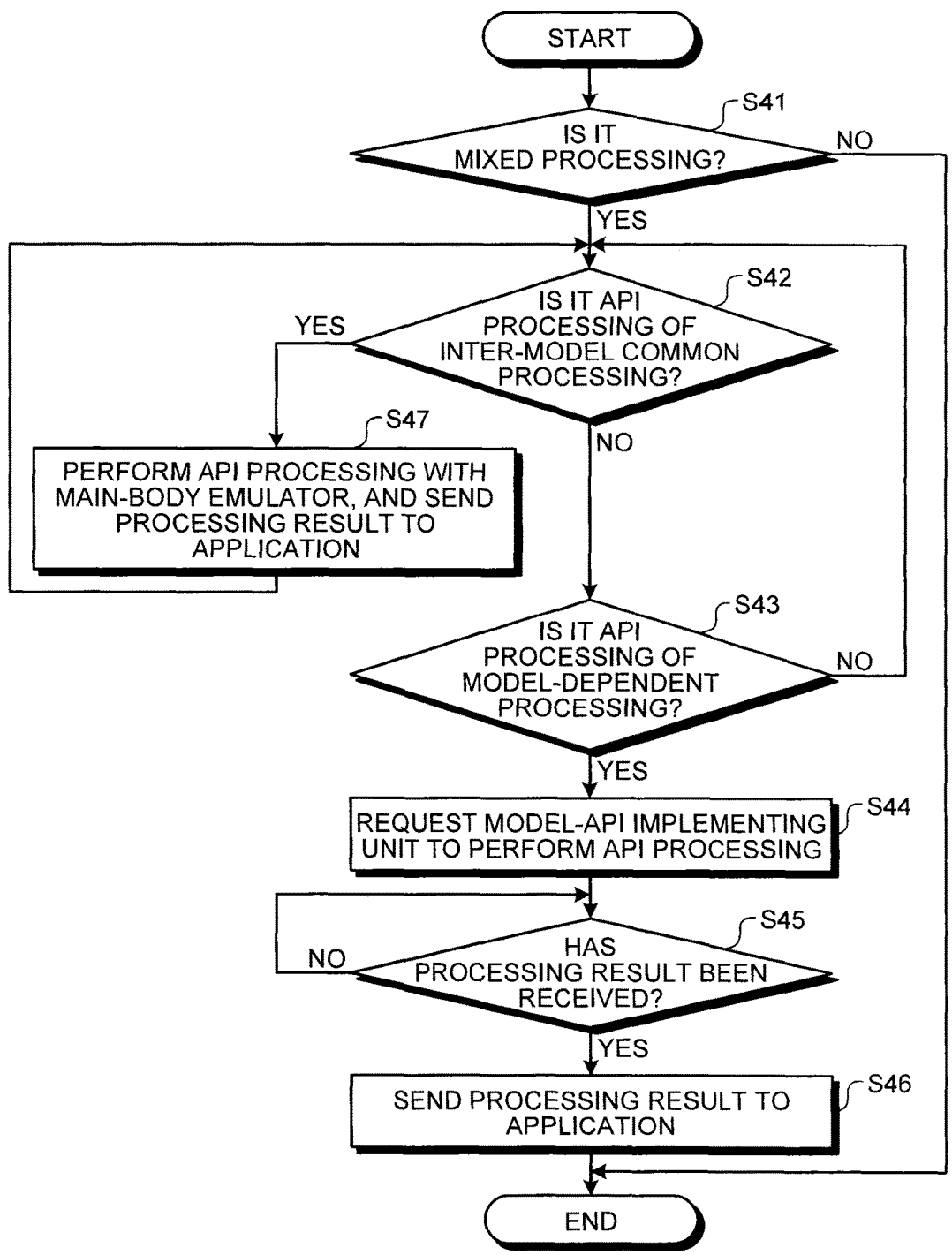

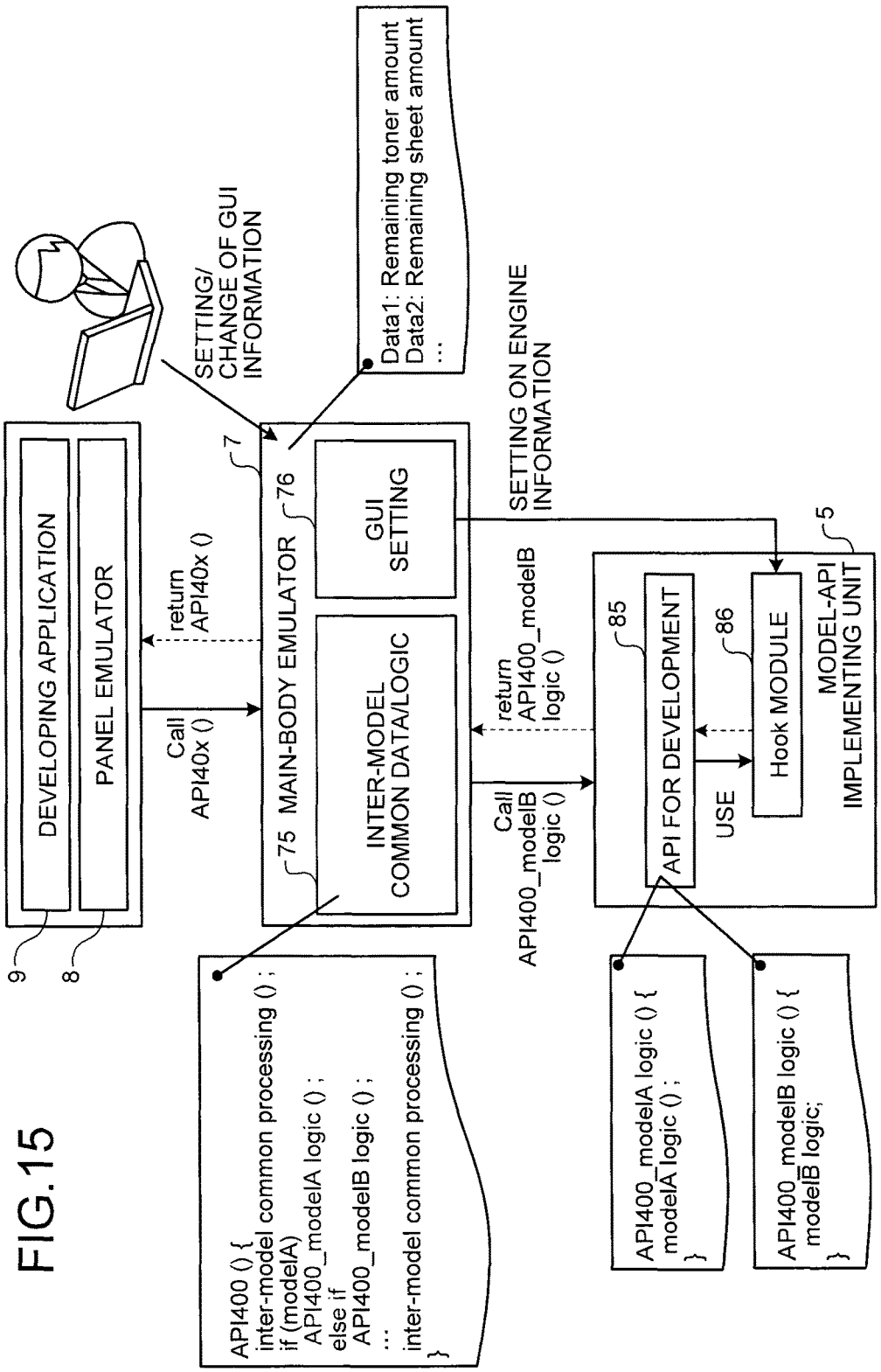

INFORMATION PROCESSING SYSTEM, COMPUTER PROGRAM PRODUCT, AND INFORMATION PROCESSING METHOD

CROSS-REFERENCE TO RELATED APPLICATIONS

The present application claims priority to and incorporates by reference the entire contents of Japanese Patent Application No. 2014-117107 filed in Japan on Jun. 5, 2014.

BACKGROUND OF THE INVENTION

1. Field of the Invention

The present invention relates to an information processing system, a computer program product, and an information processing method.

2. Description of the Related Art

Development of an application program (hereinafter, referred to simply as an "application") for various devices, for example, such as a multifunction peripheral (MFP) having multiple image forming functions is preferable to be performed by using a real machine. However, to purchase a real machine and develop an application is a financial burden on a third vender or the like. Therefore, in general, the third vender or the like performs the development of the application by using an emulator that has been provided from the side of an MFP manufacturer and artificially realizes functions of an MFP.

Conventionally, in development of an application for various devices, for example, such as an MFP having an API (application program interface) as an interface to receive request from an application, and capable of additionally implementing an application using an API, even one and the same API varies in response result according to the model of MFP.

Hence, conventionally, it was very difficult to promptly provide an emulator corresponding to each model.

Therefore, it is desirable to provide an information processing system, computer program product, and information processing method capable of causing an emulator to have a more prompt correspondence to model.

SUMMARY OF THE INVENTION

It is an object of the present invention to at least partially solve the problems in the conventional technology.

According to an aspect of the present invention, there is provided an information processing system including: an information processing apparatus including: a shared operation unit that performs verification of operation of inter-model common processing common to multiple models out of processes of an application with a first program for realizing operation common to the models, and sends a result of the operation verification to the application; a processing requesting unit that requests an external device to perform verification of operation of model-dependent processing specific to each model with a second program for realizing operation specific to each model; and an acquiring unit that acquires a result of the verification of operation of model-dependent processing from the external device, and sends the result to the application, and external devices that perform verification of operation of model-dependent processing specific to each model out of the processes of the application with the second program for realizing operation specific to each model.

According to another aspect of the present invention, there is provided a computer program product for being executed on a computer including: a shared operation unit that performs verification of operation of inter-model common processing common to multiple models out of processes of an application with a first program for realizing operation common to the models, and sends a result of the operation verification to the application; a processing requesting unit that requests an external device to perform verification of operation of model-dependent processing specific to each model with a second program for realizing operation specific to each model; and an acquiring unit that acquires a result of the verification of operation of model-dependent processing from the external device, and sends the result to the application.

According to still another aspect of the present invention, there is provide an information processing method including: a shared operation step of a shared operation unit performing verification of operation of inter-model common processing common to multiple models out of processes of an application with a first program for realizing operation common to the models and sending a result of the operation verification to the application; a processing requesting step of a processing requesting unit requesting an external device to perform verification of operation of model-dependent processing specific to each model with a second program for realizing operation specific to each model; and an acquiring step of an acquiring unit acquiring a result of the verification of operation of model-dependent processing from the external device and sending the result to the application.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 14 is a flowchart showing the flow of an operation verifying process performed when an API called from the developing application is mixture of "inter-model common processing" and "model-dependent processing"; and FIG. 15 is a diagram schematically showing the operation of the app development system when the API called from the developing application is mixture of "inter-model common processing" and "model-dependent processing".

DETAILED DESCRIPTION OF THE PREFERRED EMBODIMENTS

Figure 1:
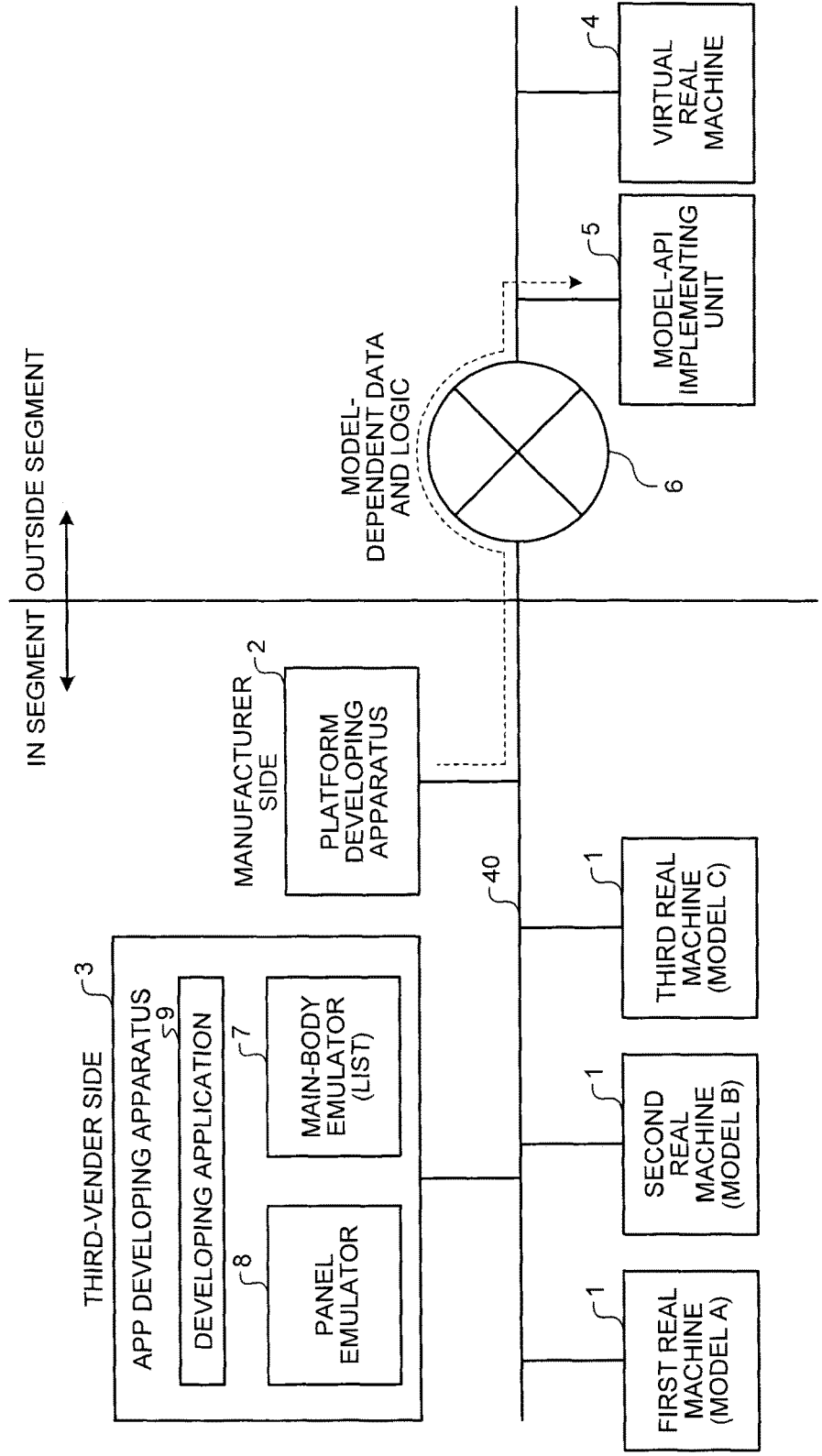
FIG. 1 is a system configuration diagram of an app development system according to an embodiment.

An exemplary embodiment of an application development system (app development system) to which an information processing apparatus, information processing system, information processing program, computer program product, and information processing method according to the present invention are applied will be explained in detail below with reference to accompanying drawings. For example, the computer program product may include one or more computer readable medium having computer readable program code.

Outline

For example, Japanese Patent Application Laid-open No. 2011-44127 has disclosed an information processing apparatus designed to appropriately make the work of development of an application platform of an image forming apparatus and the work of development of an application to be run on the application platform more efficient.

This information processing apparatus is connected to an external device including an application platform of an image forming apparatus via a network, and includes an emulating unit that emulates the platform of the image forming apparatus. The emulating unit receives information on a list of interfaces having been implemented in the platform included in the external device, and records the received list information on an implementation-information holding unit. Furthermore, the emulating unit determines whether an interface called from an application using the emulating unit has been implemented in the external device on the basis of the list information recorded on the implementation-information holding unit. Then, if having determined that the called interface has already been implemented, the emulating unit transmits a request for execution of the called interface to the external device.

Accordingly, a developer of the application can confirm the operation of the application on an actual application platform. Furthermore, along with the confirmation of the operation of the application, the developer of the application can confirm the operation of the application platform. Therefore, it is possible to appropriately make the work of development of the application platform of the image forming apparatus and the work of development of the application to be run on the application platform more efficient.

Verification of the operation of the developed application has to be performed with respect to each model. As a method to permit the verification of the operation with respect to each model, there is a "method (first method) of installing emulators for respective models of MFPs on a personal computer device or the like through which the verification of the operation is performed". Furthermore, as another method to permit the verification of the operation in each model, there is a "method (second method) of configuring an emulator to be able to be installed with an additional plug-in module having the model-specific data and logic". In the case of the second method, the common processing, logic, and data have been implemented in the emulator body, and the data and logic for each model are added as a plug-in module.

However, in the case of the first method, it is necessary to install model-by-model emulators, and this requires time and labor. Furthermore, in the case of the first method, a large storage area (resource) is required to store data of the installed model-by-model emulators.

On the other hand, in the case of the second method, it is necessary to prepare plug-in modules for respective models. Especially, a model under development requires creation of a plug-in module with every version upgrade which is performed frequently, so a great deal of time and labor is required. Furthermore, in the case of the second method, confirmation of the emulator upgrade due to the frequently-performed version upgrade and download of plug-in modules, etc. require time and labor. Moreover, in the case of the second method, the data size of the emulator changes with each addition of a plug-in module. That is, in the case of the second method, the data size of the emulator gradually increases each time a plug-in module is added.

The present embodiments provide a system, a device, a method, and a computer program product capable of causing an emulator to have a more prompt correspondence to model.

An application program interface (API) for multifunction peripheral (MFP) include a greater amount of "inter-model common processing" for the maintenance of compatibility among models. Furthermore, the inter-model common processing is less likely to be changed. On the other hand, for example, model-by-model processing by one API and "model-dependent processing", which is an API existing only in a specific model, are likely to be newly developed and be changed. A platform (PF) developer on the side of an MFP manufacturer (a manufacturer-side developer) generally designs and implements inter-model common processing in an MFP ahead of model-dependent processing. Furthermore, the manufacturer-side developer generally performs the development of the inter-model common processing and the development of the model-dependent processing separately.

Given this situation, the app development system according to the present embodiment implements only the inter-model common processing in an emulator object (referred to as a "main-body emulator") to be provided to an MFP application developer, such as a third vender, so as to provide the main-body emulator early (promptly). On the other hand, model-dependent processing is, after the main-body emulator has been provided, implemented in an MFP (a real machine), a virtual real machine, and a model-API implementing unit which are installed, for example, on a network in the same segment or on a so-called cloud computing type cloud (server group) which provides services via a network.

The manufacturer-side developer checks in each API of model-dependent processing to the model-API implementing unit. The model-API implementing unit exports the checked-in API of the model-dependent processing so that the API can be executed from a node on the network. When an API called from an application being developed is the inter-model common processing which is common processing to models, the main-body emulator provided to the third vender performs verification of the operation of the API. On the other hand, when the API called from the application is model-dependent processing which is processing specific to a model, the main-body emulator requests an external real machine mounted with an emulator for the model-dependent, a virtual real machine, or the model-API implementing unit to perform verification of the operation of the API. In other words, verification of the operation of an API for each model is performed by using either an emulator for the inter-model common processing or an emulator for model-dependent processing properly.

Accordingly, it is possible to provide an emulator corresponding to inter-model common processing to the third vender promptly and mount an emulator for model-dependent processing on a real machine, a virtual real machine, or a model-API implementing unit. Therefore, the emulator can have a more prompt correspondence to model. Furthermore, the emulator can have an efficient correspondence to model.

FIG. 1 is a system configuration diagram of the app development system according to the embodiment. As shown in FIG. 1, the app development system includes multiple real machines 1, a manufacturer-side platform developing apparatus 2, a third-vender-side app developing apparatus 3, a virtual real machine 4, and a model-API implementing unit 5. FIG. 1 shows an example where first to third real machines 1 are provided as the real machines 1. The first to third real machines 1 are different models: model A, model B, and model C, respectively. Furthermore, these real machines 1 are MFPs having one or more functions out of, for example, a printing function, a copy function, a scanner function, and a facsimile function. Incidentally, a device such as a projector device, a video teleconference system, or a digital camera device can be used instead of an MFP.

In the case of the example shown in FIG. 1, the multiple real machines 1, the platform developing apparatus 2, and the app developing apparatus 3 are placed in a predetermined segment, such as in the same building or in the same site, and are connected to one another via a network 40 for a narrow area, such as a local area network (LAN).

The virtual real machine 4 and the model-API implementing unit 5 are placed on a network 6 for a wide area, such as the Internet, so as to be located outside the segment. Therefore, "the virtual real machine 4 and the model-API implementing unit 5" are interconnected to "the multiple real machines 1, the platform developing apparatus 2, and the app developing apparatus 3" via the wide area network 6, such as the Internet.

Incidentally, the real machines 1, the virtual real machine 4, and the model-API implementing unit 5 can be placed either in or outside the segment as long as they can be network-connected to a main-body emulator 7 of the app developing apparatus 3.

The platform developing apparatus 2 is an apparatus operated by a manufacturer-side developer of the real machines 1. Using the platform developing apparatus 2, the manufacturer-side developer performs developments of an emulator for "inter-model common processing", which is an API common to the real machines 1, and an emulator for "model-dependent processing", which is an API for each model of real machine 1, separately. The emulator for "inter-model common processing" (an inter-model common emulator: an example of a first program) is provided to the third vender or the like promptly. The platform developing apparatus 2 executes the inter-model common emulator, thereby realizing the main-body emulator 7, which is an example of a shared operation unit, and a panel emulator 8 to be described later. On the other hand, the emulator for "model-dependent processing" (a model-dependent emulator: an example of a second program) is implemented in the model-API implementing unit 5 via the network 6 each time each model of emulator has been developed.

The app developing apparatus 3 includes an emulator for real machine 1; the emulator is provided from the manufacturer side to develop a developing application 9 (an example of an application) for real machine 1. As will be described later as an example, each of the real machines 1 installed in the app development system according to the embodiment are configured so that an operation unit (reference numeral 20 in FIG. 2) can be physically separated from a main body (reference numeral 10 in FIG. 2) of the real machine 1. Alternatively, the real machines 1 can employ a mobile terminal device, such as a smartphone or a tablet terminal device, as the operation unit. Therefore, two different emulators are provided to the third vender; one is the main-body emulator 7 for emulating the inter-model common processing by the main body of the real machine 1, and the other is the panel emulator 8 for emulating an operation of the main body of the real machine 1 performed through the operation unit which can be separated from the main body of the real machine 1.

When the third vender performs verification of the operation of inter-model common processing of the developing application 9, the third vender performs the verification of the operation by using the main-body emulator 7 and the panel emulator 8. Furthermore, when the third vender performs verification of the operation of model-dependent processing of the developing application 9, the third vender entrusts the verification of the operation of the API to any one of the real machines 1, virtual real machine 4, and model-API implementing unit 5 capable of the verification of the operation of the model-dependent processing, and obtains a result of the operation verification.

The virtual real machine 4 is a virtual machine that each model of real machine 1 has been virtualized by virtual personal computer software, such as VMware™ or Parallels™. The third vender entrusts verification of the operation of an API dependent on a model corresponding to an application under development to the virtual real machine 4 mounted with the corresponding model of emulator, and obtains a result of the operation verification.

A program (data and logic, etc.) of a model-dependent API is uploaded from the platform developing apparatus 2 to the model-API implementing unit 5. The model-API implementing unit 5 has a function of exporting the uploaded program to call processing of the uploaded program from the outside (a function of saving a file in a form that another application can interpret).

Figure 2:
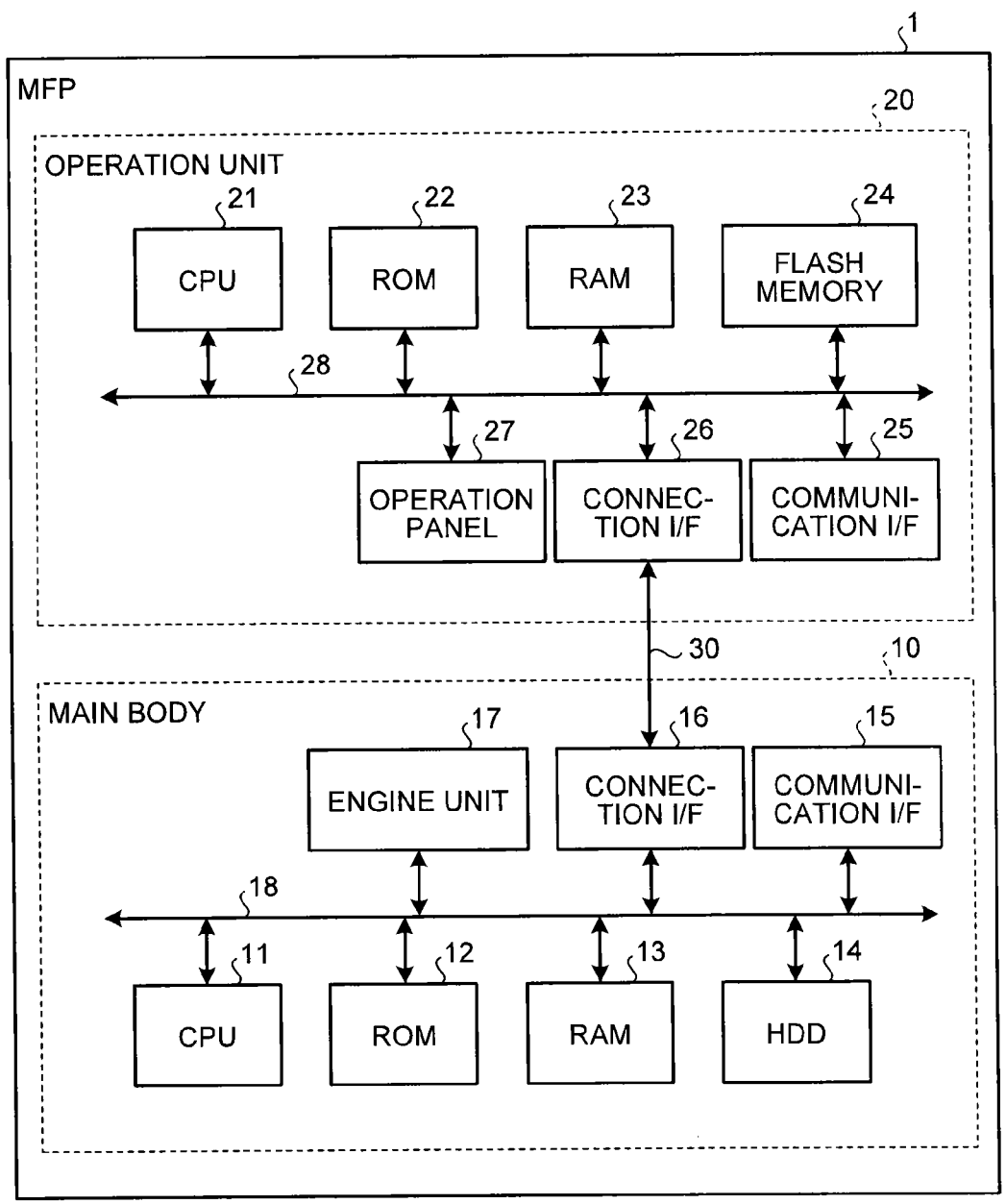
FIG. 2 is a hardware configuration diagram of a multifunction peripheral (a real machine) installed in the app development system according to the embodiment.

Subsequently, a hardware configuration diagram of the real machine 1, which is an MFP in this example, is shown in FIG. 2. The real machine 1 includes the main body 10 and the operation unit 20; the main body 10 is equipped with various functions, such as a copy function, a scanner function, a fax function, and a printer function, and the operation unit 20 receives an input according to a user operation. The main body 10 and the operation unit 20 are connected via a dedicated communication path 30 so as to be able to communicate with each other. As the communication path 30, for example, a communication path based on the universal serial bus (USB) standard can be used; however, others based on any standards can also be used regardless of wired or wireless.

As the operation unit 20, an information processing terminal, such as a smartphone or a tablet terminal, which is a stand-alone, self-contained electronic device capable of information processing can be used. In this case, for example, various operation screens of applications running on the main body 10 of the real machine 1 are displayed on the information processing terminal used as the operation unit 20. Accordingly, the operation unit 20 serves as an operation unit of the real machine 1. Incidentally, hereinafter, just the term "operation panel" refers to an operation panel which has been fixed and installed in the real machine 1.

More specifically, instead of the operation panel which has been fixed and installed as an operation unit exclusively for the real machine 1, the information processing terminal used as the operation unit 20 is removably attached to the real machine 1. That is, while the information processing terminal used as the operation unit 20 is removable (separable), it is installed integrally with the real machine 1 at a predetermined position, such as a position where the operation panel of the real machine 1 is placed. Therefore, the information processing terminal used as the operation unit 20 and the real machine 1 can be taken as one device. When the information processing terminal which is the operation unit 20 has been removed from the real machine 1, the information processing terminal performs wireless communication, such as Bluetooth™ or infrared communication, with the real machine 1 and serves as an operation unit of the real machine 1.

Incidentally, the main body 10 performs an operation according to the input received by the operation unit 20. Furthermore, the main body 10 can communicate with an external device such as a client personal computer (PC), and can operate in response to an instruction received from the external device.

Subsequently, a hardware configuration of the main body 10 is explained. As shown in FIG. 2, the main body 10 includes a CPU 11, a ROM 12, a RAM 13, a hard disk drive (HDD) 14, a communication interface (I/F) 15, a connection I/F 16, and an engine unit 17. These components 11 to 17 are connected to one another via a system bus 18.

The CPU 11 controls the operation of the main body 10 overall. The CPU 11 executes an application program having been stored in the ROM 12 or the HDD 14, etc. by using the RAM 13 as a work area. Accordingly, the CPU 11 controls the operation of the entire main body 10, and realizes various functions, such as the copy function, the scanner function, the fax function, and the printer function.

The communication I/F 15 is an interface for communicating with an external device such as a client PC. The connection I/F 16 is an interface for communicating with the operation unit 20 via the communication path 30. Incidentally, in FIG. 2, the communication path 30 is represented as a fixed line; however, as described above, the operation unit 20 is installed to be attachable to and removably from the main body 10 of the real machine 1. Therefore, while the operation unit 20 is being attached to the real machine 1, the communication path 30 is understood to serve as a wired communication path; on the other hand, when the operation unit 20 has been removed from the real machine 1, the communication path 30 is understood to serve as a wireless communication path.

The engine unit 17 is hardware that performs generic information processing and processing other than communication in order to realize the copy function, the scanner function, the fax function, and the printer function. The engine unit 17 includes a scanner (an image reading unit) that reads, for example, an image of an original by scanning the original, a plotter (an image forming unit) that performs printing on a sheet material such as a sheet of paper, and a fax unit that performs fax communication, etc. Furthermore, the engine unit 17 can be provided with specific options such as a finisher for sorting printed sheet materials and an automatic document feeder (ADF) for automatically feeding originals.

Subsequently, a hardware configuration of the operation unit 20 is explained. As shown in FIG. 1, the operation unit 20 includes a CPU 21, a ROM 22, a RAM 23, a flash memory 24, a communication I/F 25, a connection I/F 26, and an operation panel 27. These components 21 to 27 are connected to one another via a system bus 28.

The CPU 21 controls the operation of the operation unit 20 overall. The CPU 21 executes a program having been stored in the ROM 22 or the flash memory 24, etc. by using the RAM 23 as a work area. Accordingly, the CPU 21 controls the operation of the entire operation unit 20, and realizes various functions, such as display of information (an image) according to a user input received, to be described later.

The communication I/F 25 is an interface for communicating with a given server device on the network 40. The connection I/F 26 is an interface for communicating with the main body 10 via the communication path 30.

The operation panel 27 receives a variety of inputs according to user operations, and displays thereon a variety of information, such as information according to a received input, information indicating an operating state of the real machine 1, and a setting status. In this example, the operation panel 27 is composed of a liquid crystal display (LCD) equipped with a touch panel function; however, the operation panel 27 is not limited to this. For example, the operation panel 27 can be composed of an organic EL display equipped with a touch panel function. Furthermore, in addition to or instead of this, an operation unit, such as a hardware key, or a display unit, such as a light-emitting part, can be installed in the operation panel 27.

Figure 3:
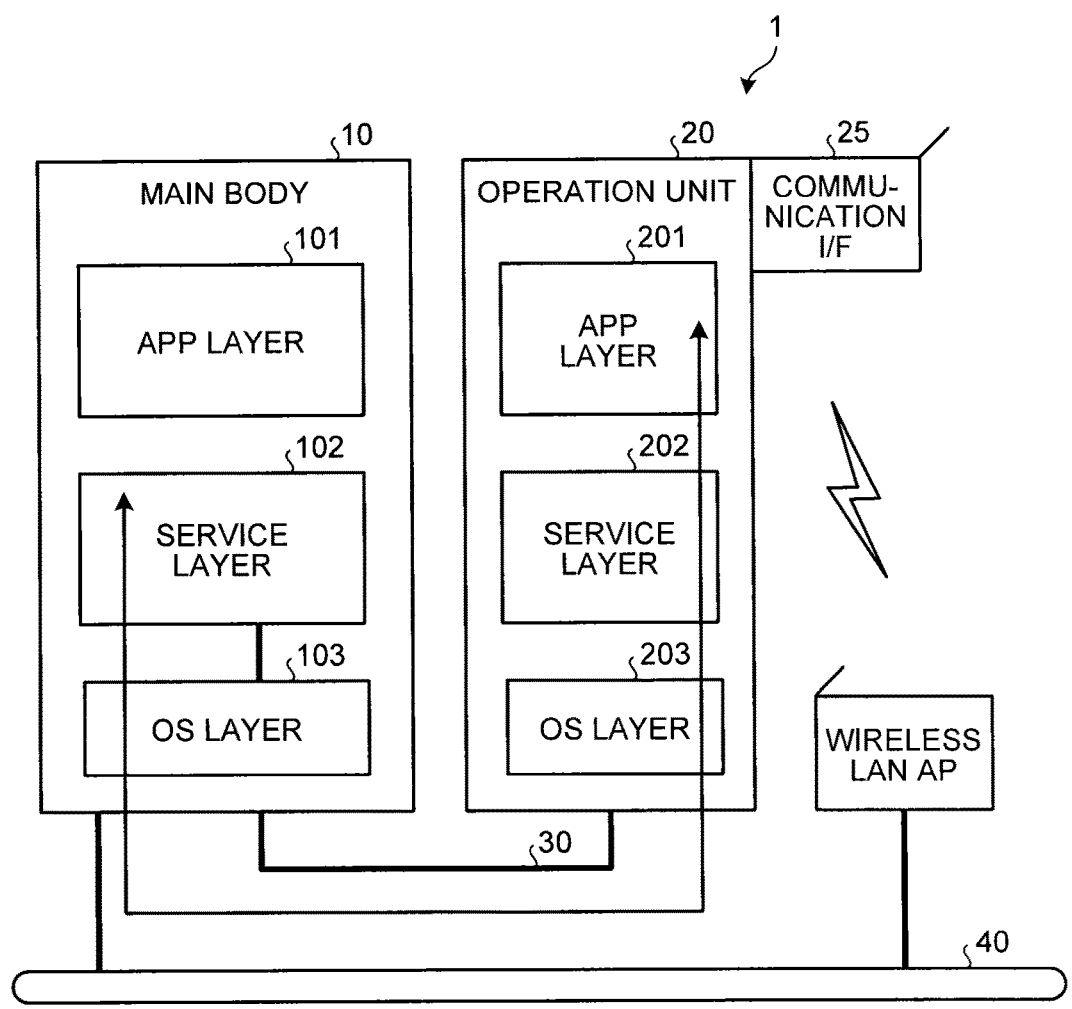
FIG. 3 is a schematic diagram showing an example of a software configuration of the real machine installed in the app development system according to the embodiment.

Subsequently, FIG. 3 is a schematic diagram showing an example of a software configuration of the real machine 1. As shown in FIG. 3, the main body 10 of the real machine 1 has an app layer 101, a service layer 102, and an OS layer 103. Entities of the app layer 101, the service layer 102, and the OS layer 103 are each a piece of software having been stored in the ROM 12 or the HDD 14, etc. The CPU 11 executes these pieces of software, thereby various functions are provided.

The software of the app layer 101 is an application program (in the following description, referred to simply as an "application") for operating a hardware resource thereby providing a given function. Such applications include, for example, a copy application for providing a copy function and a scanner application for providing a scanner function. Furthermore, the applications include a fax application for providing a fax function and a printer application for providing a printer function, etc.

The software of the service layer 102 is software that lies between the app layer 101 and the OS layer 103 and is for providing an application with an interface for using a hardware resource that the main body 10 has. Specifically, the software of the service layer 102 is software that receives an operation request to a hardware resource and is for providing a function of mediating the operation request. Such operation requests received by the service layer 102 include requests for scanner reading and plotter printing, etc.

Incidentally, the interface function by the service layer 102 is provided not only to the app layer 101 of the main body 10 but also to an app layer 201 of the operation unit 20. That is, the app layer 201 (an app) of the operation unit 20 can also realize a function using a hardware resource (for example, the engine unit 17) of the main body 10 through the interface function of the service layer 102.

The software of the OS layer 103 is basic software (an operating system) for providing a basic function of controlling hardware included in the main body 10. The software of the service layer 102 converts a request for use of a hardware resource from an app into a command that the OS layer 103 can interpret, and passes the command to the OS layer 103. Then, the command is executed by the software of the OS layer 103, thereby the hardware resource performs an operation according to the app's request.

Likewise, the operation unit 20 has the app layer 201, a service layer 202, and an OS layer 203. The hierarchical structure of the app layer 201, the service layer 202, and the OS layer 203 of the operation unit 20 is the same as that of the main body 10 side. However, a function provided by an application of the app layer 201 and types of operation requests that the service layer 202 can receive are different from the main body 10 side. The application of the app layer 201 can be software for causing a hardware resource included in the operation unit 20 to operate thereby providing a predetermined function. The application of the app layer 201 mainly provides a UI function for performing an operation and display relating to the copy function, the scanner function, the fax function, and the printer function, etc. that the main body 10 has. UI is an abbreviation of "user interface".

Incidentally, in the case of the real machine 1 installed in an information processing system 100 according to the embodiment as just one example, to maintain the independence of functions, software of the OS layer 103 of the main body 10 side is different from software of the OS layer 203 of the operation unit 20 side. That is, the main body 10 and the operation unit 20 of the real machine 1 operate independently on different operating systems from each other. For example, Linux™ is used as the software of the OS layer 103 of the main body 10 side, and Android™ is used as the software of the OS layer 203 of the operation unit 20 side.

The main body 10 and the operation unit 20 of the real machine 1 operate on different operating systems in this way; therefore, communication between the main body 10 and the operation unit 20 is performed not as interprocess communication in a shared device but as communication between different devices. For example, an operation of transmitting an input (content of an instruction from a user) received by the operation unit 20 to the main body 10 (a command communication) or an operation of the main body 10 notifying the operation unit 20 of an event, etc. falls under this. Here, the operation unit 20 performs a command communication with the main body 10, and thereby can use a function of the main body 10. Furthermore, events notified to the operation unit 20 by the main body 10 include an execution state of an operation in the main body 10 and contents set on the main body 10 side, etc. Moreover, the power to the operation unit 20 is supplied from the main body 10 through the communication path 30. Therefore, the power control on the operation unit 20 can be performed separately (independently) from the power control on the main body 10.

Figure 4:
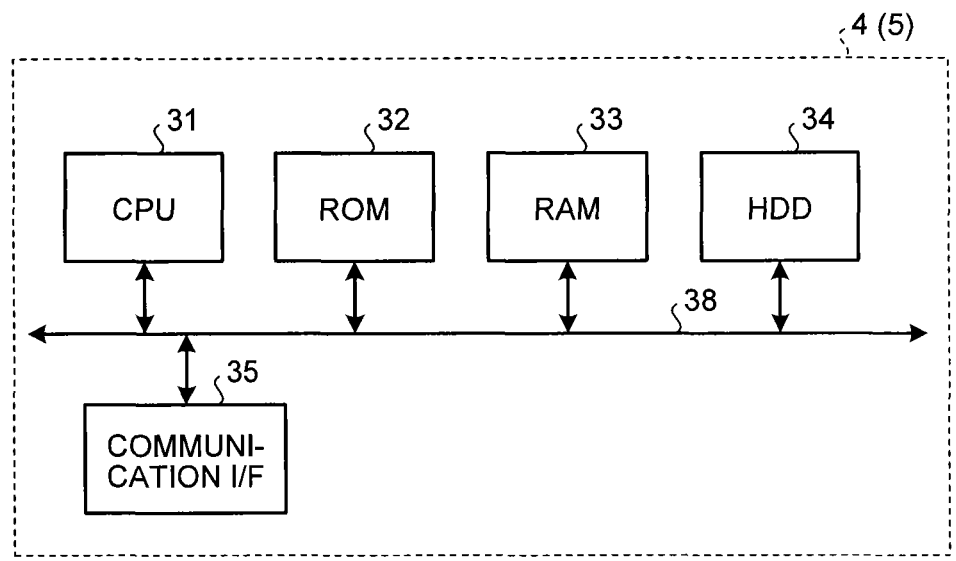
FIG. 4 is a hardware configuration diagram of a virtual real machine and a model-API implementing unit installed in the app development system according to the embodiment.

Subsequently, FIG. 4 shows a hardware configuration of the virtual real machine 4 and the model-API implementing unit 5. As shown in FIG. 4, the virtual real machine 4 and the model-API implementing unit 5 each include a CPU 31, a ROM 32, a RAM 33, an HDD 34, and a communication I/F 35. These components 31 to 35 are connected to one another via a system bus 38.

The CPU 31 controls the operation of the virtual real machine 4 or the model-API implementing unit 5 overall. The CPU 31 performs verification of the operation of an API requested from the main-body emulator 7 of the app developing apparatus 3 with a model-by-model emulator having been stored in the ROM 32 or the HDD 34, etc. by using the RAM 33 as a work area, and transmits a result of the operation verification. The communication I/F 35 establishes a communication line to a communication I/F 55 of the app developing apparatus 3 to be described later, and receives verification of the operation of an API requested from the main-body emulator 7.

Figure 5:
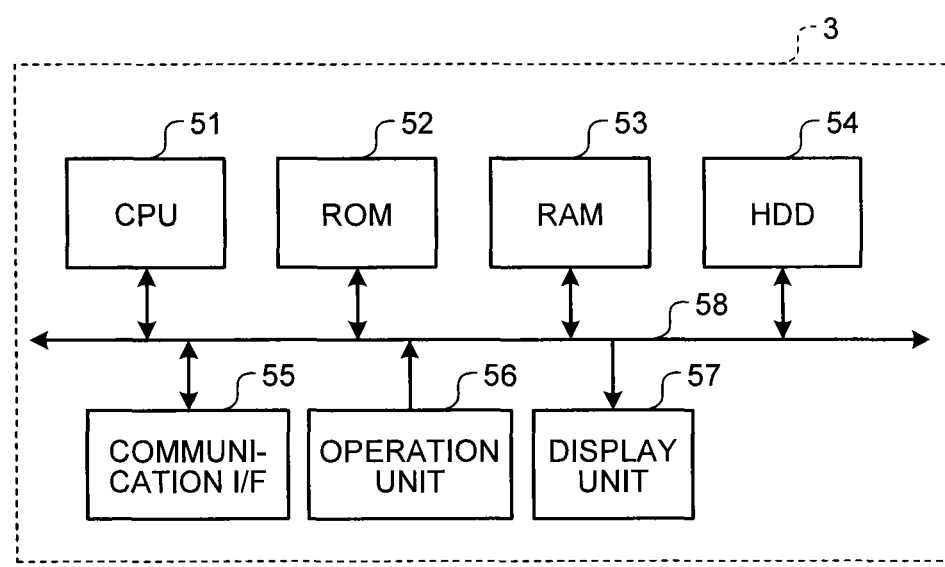
FIG. 5 is a hardware configuration diagram of an app developing apparatus installed in the app development system according to the embodiment.

Subsequently, FIG. 5 shows a hardware configuration of the app developing apparatus 3. As shown in FIG. 5, the app developing apparatus 3 includes a CPU 51, a ROM 52, a RAM 53, an HDD 54, the communication I/F 55, an operation unit 56, and a display unit 57. These components 51 to 57 are connected to one another via a system bus 58.

The CPU 51 controls the operation of the app developing apparatus 3 overall. The CPU 51 performs verification of the operation of an inter-model common API of the developing application 9 with an emulator having been stored in the ROM 32 or the HDD 34, etc. by using the RAM 33 as a work area. Furthermore, the CPU 51 requests the real machine 1, the virtual real machine 4, or the model-API implementing unit 5 to perform verification of the operation of an API specific to each model, and obtains a result of the operation verification and transmits the result to the developing application 9. Incidentally, the platform developing apparatus 2 has the same hardware configuration as the app developing apparatus 3 shown in FIG. 5.

Figure 6:
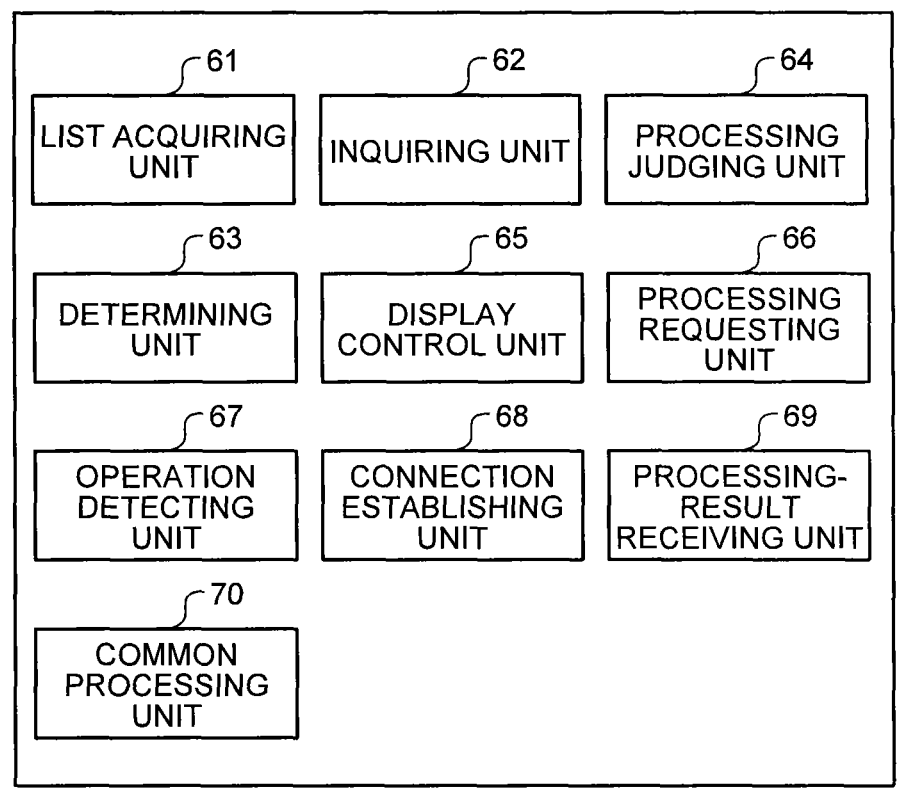
FIG. 6 is a functional block diagram of the app developing apparatus installed in the app development system according to the embodiment.

Subsequently, FIG. 6 shows a functional block diagram of functions realized by the CPU 51 of the app developing apparatus 3 executing an emulator provided from the manufacturer side. As shown in FIG. 6, the CPU 51 executes the emulator, thereby serving as a list acquiring unit 61, an inquiring unit 62, a determining unit 63, a processing judging unit 64, a display control unit 65, a processing requesting unit 66, an operation detecting unit 67, a connection establishing unit 68, a processing-result receiving unit 69, and a common processing unit 70.

The list acquiring unit 61 acquires an API list showing models names of the real machines 1 and APIs for the models of real machines 1. The API list is an example of second list information. Version information can be added to each model name. The API list can be included in the emulator, or can be acquired from a distribution server device on the network 6. The inquiring unit 62 makes an inquiry to the real machines 1, the virtual real machine 4, and the model-API implementing unit 5 whether it is possible to execute verification of the operation of each API specific to each model. The determining unit 63 determines whether verification of the operation of each API can be executed by each of the real machines 1, the virtual real machine 4, or the model-API implementing unit 5 from a result of the inquiry.

The processing judging unit 64 judges either "inter-model common processing", which is common processing among the models of real machines 1, or "model-dependent processing", which is processing for each model of real machine 1, an API called from the developing application 9 falls under. The display control unit 65 displays a list of emulatable models of real machines 1 etc. on the display unit 57. The processing requesting unit 66 requests the real machine 1, the virtual real machine 4, or the model-API implementing unit 5 to perform verification of the operation of an API of "model-dependent processing". Incidentally, the real machine 1, the virtual real machine 4, and the model-API implementing unit 5 are examples of an external device. The operation detecting unit 67 detects an operation of selecting a desired model to be emulated by the third vender through the operation unit 56 from the list of models. The connection establishing unit 68 establishes a connection between the real machine 1, virtual real machine 4, or model-API implementing unit 5 capable of executing verification of the operation of an API for each model and the app developing apparatus 3. Incidentally, the term "establishment of a connection" here means that the connection establishing unit 68 puts the app developing apparatus 3 in a fit state to perform some kind of communication with a model of real machine 1 selected by the third vender, a virtual real machine 4 that the selected model has been virtualized, and the model-API implementing unit 5. Specifically, the connection establishing unit 68 can store therein IP addresses of the model of real machine 1 selected by the third vender, the virtual real machine 4 that the selected model has been virtualized, and the model-API implementing unit 5. Furthermore, the connection establishing unit 68 can establish communication lines between the model of real machine 1 selected by the third vender, the virtual real machine 4 that the selected model has been virtualized, and the model-API implementing unit 5 and the app developing apparatus 3 through the communication I/F 55.

The processing-result receiving unit 69 is an example of an acquiring unit. The processing-result receiving unit 69 receives a result of verification of the operation of an API specific to each model which has been transmitted from the real machine 1, the virtual real machine 4, or the model-API implementing unit 5. The common processing unit 70 performs, if an API called from the developing application 9 is "inter-model common processing" which is common processing among the models of real machines 1, verification of the operation of the called API.

Incidentally, in this example, the units 61 to 70 are realized through software by the CPU 51 executing the emulator; however, some or all of the functions can be realized by hardware.

Furthermore, the emulator can be provided in such a manner that the emulator is recorded on a computer-readable recording medium, such as a CD-ROM or a flexible disk (FD), in an installable or executable file format. Moreover, the emulator can be provided in such a manner that the emulator is recorded on a computer-readable recording medium, such as a CD-R, a DVD, a Blu-ray Disc™, or a semiconductor memory. DVD is an abbreviation of "digital versatile disk". Furthermore, the emulator can be provided in such a manner that the emulator is installed via a network such as the Internet. Moreover, the emulator can be built into a ROM or the like in an apparatus in advance.

Figure 7:
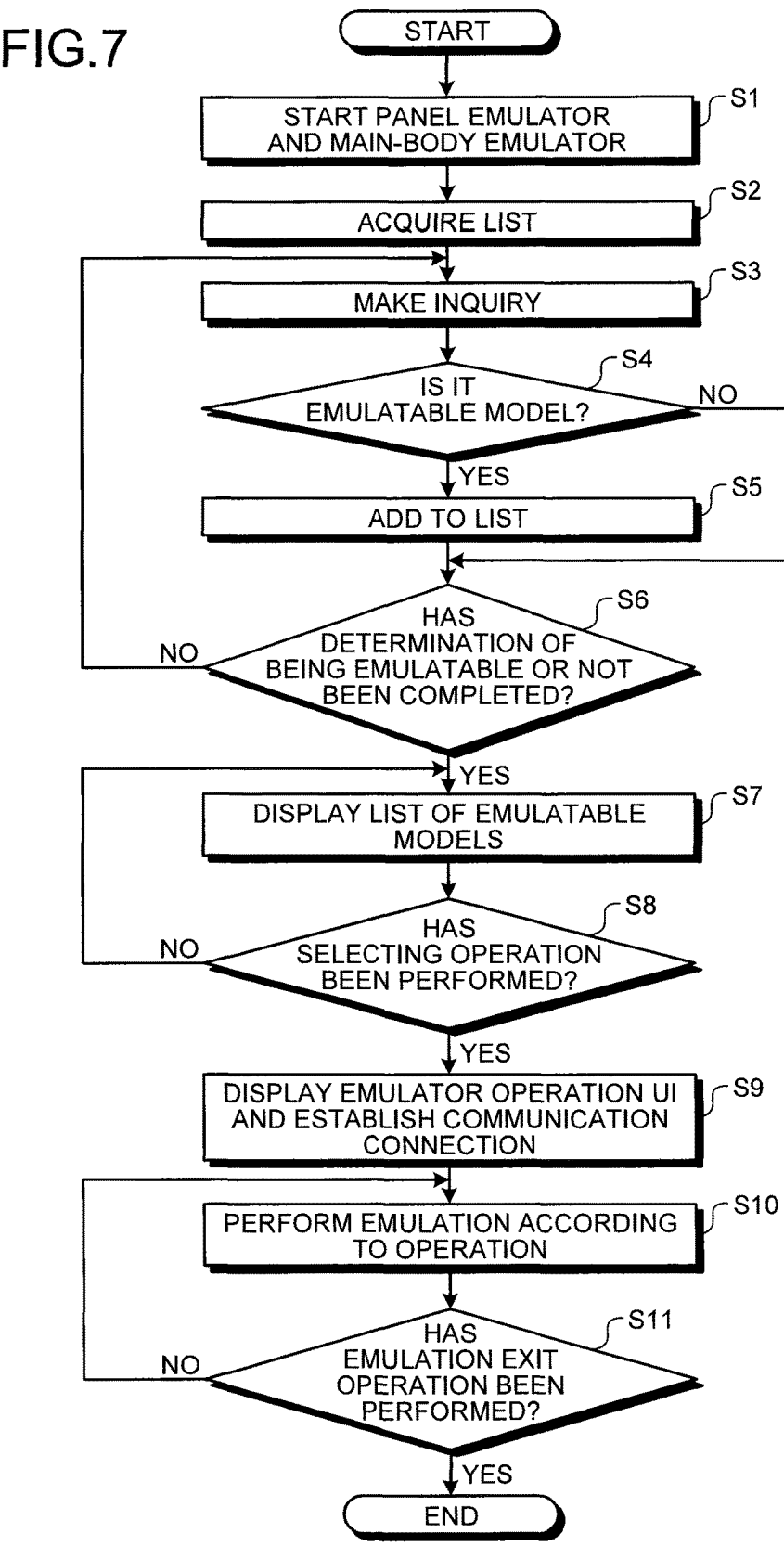
FIG. 7 is a flowchart showing the flow of an API-operation verifying process performed in the app developing apparatus installed in the app development system according to the embodiment.

Subsequently, a flowchart of FIG. 7 shows the flow of an API-operation verifying process performed in the app developing apparatus 3. The third vender installs an emulator of the real machine 1 provided from the manufacturer side in the app developing apparatus 3. Then, the third vender performs an operation of starting the installed emulator. When having detected the emulator starting operation, the CPU 51 shown in FIG. 5 operates in accordance with the emulator having been stored in the HDD 54 or the like, thereby realizing functions as the units 61 to 70 shown in FIG. 6 and performing the process shown in the flowchart of FIG. 7.

First, the emulator of the real machine 1 provided from the manufacturer side includes the main-body emulator 7 and the panel emulator 8 as described above. At Step S1, the CPU 51 reads out the main-body emulator 7 and the panel emulator 8 from the HDD 54 or the like, and starts the main-body emulator 7 and the panel emulator 8, and the process moves on to Step S2.

At Step S2, the list acquiring unit 61 shown in FIG. 6 acquires an API list. The API list is included in the emulator and provided from the manufacturer side. Alternatively, the API list can be acquired from a given server device on the network 6.

For example, the API list is a list of model-by-model APIs, like model A as a model name of first real machine 1 and a list of APIs for the first real machine 1, model B as a model name of second real machine 1 and a list of APIs for the second real machine 1, model C as a model name of third real machine 1 and a list of APIs for the third real machine 1, . . . . Incidentally, respective version numbers of the models can be included in the API list.

Next, at Step S3, the inquiring unit 62 makes an inquiry to the real machines 1, the virtual real machine 4, and the model-API implementing unit 5. At Step S4, the determining unit 63 determines whether the real machine 1, the virtual real machine 4, or the model-API implementing unit 5 is a model capable of executing verification of the operation of APIs listed in the API list from a result of the inquiry.

Specifically, the determination of whether each real machine 1 can emulate or not is performed as follows. For example, when a list of APIs for the model A of first real machine 1 has been listed in the API list, at Step S3, the inquiring unit 62 tries to establish a communication line connection to the model A of first real machine 1. Furthermore, at Step S4, the determining unit 63 detects a version number of the model A with reference to the API list for the model A of first real machine 1. When the communication line connection to the model A of first real machine 1 is enabled and the version number of the model A shown in the API list is "v1.00" onward indicating that it has been commercialized, this means the following. In this case, the model A of first real machine 1 is more likely to be mounted with functions of emulating all model-dependent APIs. Therefore, at Step S4, the determining unit 63 determines that the model A of first real machine 1 is a model that can support all model-dependent APIs (an emulatable model) (YES at Step S4), and the process moves on to Step S5. Incidentally, when the determining unit 63 has determined at Step S4 that the model A of first real machine 1 is not an emulatable model (NO at Step S4), the process moves on to Step S6.

Furthermore, as another example, when each real machine 1 has received the inquiry from the inquiring unit 62, the real machine 1 sends back a list of APIs whose operation can be verified (a verification API list) to the inquiring unit 62. The verification API list is an example of first list information.

The determining unit 63 compares the verification API list sent from each real machine 1 with the above-described API list. Then, for example, when all APIs for the model A in the API list are included in APIs in the verification API list sent from the model A, the determining unit 63 determines that the model A of first real machine 1 is a real machine 1 capable of performing verification of the operations of the all APIs for the model A in the API list.

The determination of whether each virtual real machine 4 can emulate or not is performed as follows. A virtual real machine 4 that a real machine 1 has been virtualized can be considered to be equivalent to the real machine 1. For example, when a list of APIs for the model B of second real machine 1 has been listed in the API list, at Step S3, the inquiring unit 62 tries to establish a communication line connection to a virtual real machine 4 that the model B of second real machine 1 has been virtualized. Furthermore, at Step S4, the determining unit 63 detects a version number of the model B with reference to the API list for the model B of second real machine 1. When the communication line connection to the virtual real machine 4 that the model B of second real machine 1 has been virtualized is enabled and the version number of the model B shown in the API list is "v1.00" onward indicating that it has been commercialized, this means the following. In this case, the virtual real machine 4 that the model B of second real machine 1 has been virtualized is more likely to be mounted with functions of emulating all model-dependent APIs. Therefore, at Step S4, the determining unit 63 determines that the virtual real machine 4 that the model B of second real machine 1 has been virtualized is a model that can support all model-dependent APIs (an emulatable model) (YES at Step S4), and the process moves on to Step S5.

Furthermore, as another example, when each virtual real machine 4 has received the inquiry from the inquiring unit 62, the virtual real machine 4 sends back a list of APIs whose operation can be verified (a verification API list) to the inquiring unit 62. The determining unit 63 compares the verification API list sent from each virtual real machine 4 with the above-described API list. Then, for example, when all APIs for the model A in the API list are included in APIs in the verification API list sent from the model A, the determining unit 63 determines that a virtual real machine 4 for the model A is a virtual real machine 4 capable of performing verification of the operations of the all APIs for the model A in the API list.

The determination of whether each model-API implementing unit 5 can emulate or not is performed as follows. To each API listed in the API list, classification information indicating that the API is either an API of "inter-model common processing" common to the models or an API of "model-dependent processing" specific to each model is added. Incidentally, the classification information can be acquired, for example, from a given server device placed on the network 6. For example, assume that API100( ) of API is an API that acquires the name of a platform by a character string (a return value is not dependent on model and is a predetermined fixed value), and is inter-model common processing. Furthermore, assume that out of API400( ) of APIs, some APIs are model-dependent processing. In such a case, to determine whether API400( ) can be emulated or not, the inquiring unit 62 makes an inquiry to the model-API implementing unit 5 whether the model-API implementing unit 5 has been mounted with functions of emulating the some APIs which are model-dependent processing out of API400( ) of APIs. The following is an example of comments and source code of a program for controlling the inquiring unit 62 to make such an inquiry.

//API400 partially includes model-dependent processing
//the main-body emulator 7 checks if API400_modelA logic() and API400_modelB logic() have been implemented in the model-API implementing unit 5.

```
API400( ){
    inter-model common processing( );
    if (modelA){
        API400_modelA logic( );
    }else if{
        API400_modelB logic( );
    }else{
        API400_emulator logic( );
    }
    inter-model common processing( );
}
```

If processing of API400() has been implemented in the model-API implementing unit 5, the determining unit 63 determines that processing of API400() can be emulated. In this way, the inquiring unit 62 and the determining unit 63 determine whether verification of the operations of all APIs for each model is possible. Then, when the determining unit 63 has determined that the verification of the operations of the all APIs is possible, the determining unit 63 determines that the model is an emulatable model.

Furthermore, as another example, when the model-API implementing unit 5 has received the inquiry from the inquiring unit 62, the model-API implementing unit 5 sends back a list of APIs whose operation can be verified (a verification API list) to the inquiring unit 62. The determining unit 63 compares the verification API list sent from the model-API implementing unit 5 with the above-described API list. Then, for example, when all APIs for the model A in the API list are included in APIs in the verification API list sent from the model A, the determining unit 63 determines that a model-API implementing unit 5 for the model A is a model-API implementing unit 5 capable of performing verification of the operations of the all APIs for the model A in the API list.

Next, at Step S5, the display control unit 65 adds, for example, the model name and version number of the model A to an abuilding list of emulatable models, and the process moves on to Step S6. At Step S6, the determining unit 63 determines whether the determination of being emulatable or not with respect to all the models listed in the API list has been completed. When the determining unit 63 has determined that the determination of being emulatable or not with respect to all the models listed in the API list has not been completed (NO at Step S6), the process returns to Step S3. On the other hand, when the determining unit 63 has determined that the determination of being emulatable or not with respect to all the models has been completed (YES at Step S6), the process moves on to Step S7.

Figure 8:
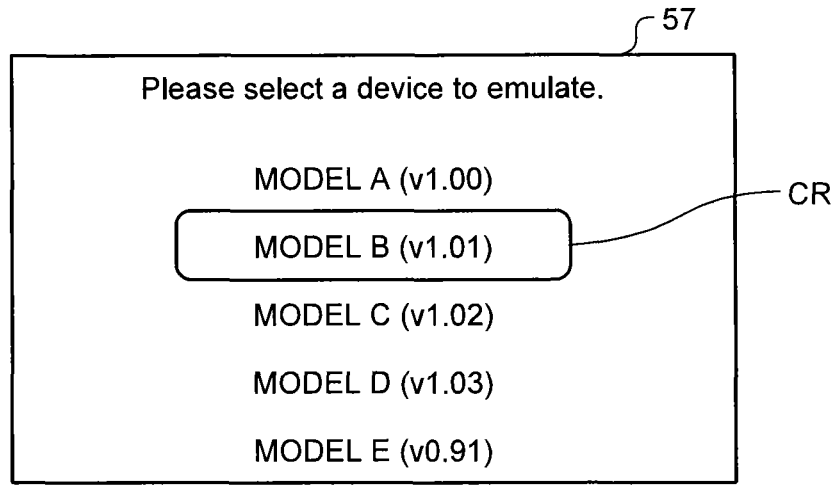
FIG. 8 is a diagram showing an example of a virtually-operating device selection screen displayed on the app developing apparatus.

At Step S7, the display control unit 65 displays the list of emulatable models formed at Step S5 on the display unit 57 of the app developing apparatus 3. FIG. 8 shows an example of the list of emulatable models. In the case of the example in FIG. 8, the list of the model names, such as model A and model B, and the version numbers, such as "v1.00" and "v1.01", are displayed. The third vender looks at this list and selects a model with which verification of the operation of an application created by the third vender is performed.

Specifically, the third vender performs a moving operation of moving a cursor CR to the display position of the desired model name and a determining operation of determining the selection of the model at the position of the cursor CR through the operation unit 56, thereby selecting the desired model. At Step S8, the operation detecting unit 67 determines whether a determining operation of determining the selection of the desired model has been performed by monitoring the operation state of the operation unit 56. Until the operation detecting unit 67 has detected a determining operation of determining the selection of the desired model (NO at Step S8), the processes at Steps S7 and S8 are repeatedly performed. When the operation detecting unit 67 has detected a determining operation of determining the selection of the desired model (YES at Step S8), the process moves on to Step S9.

Figure 9:
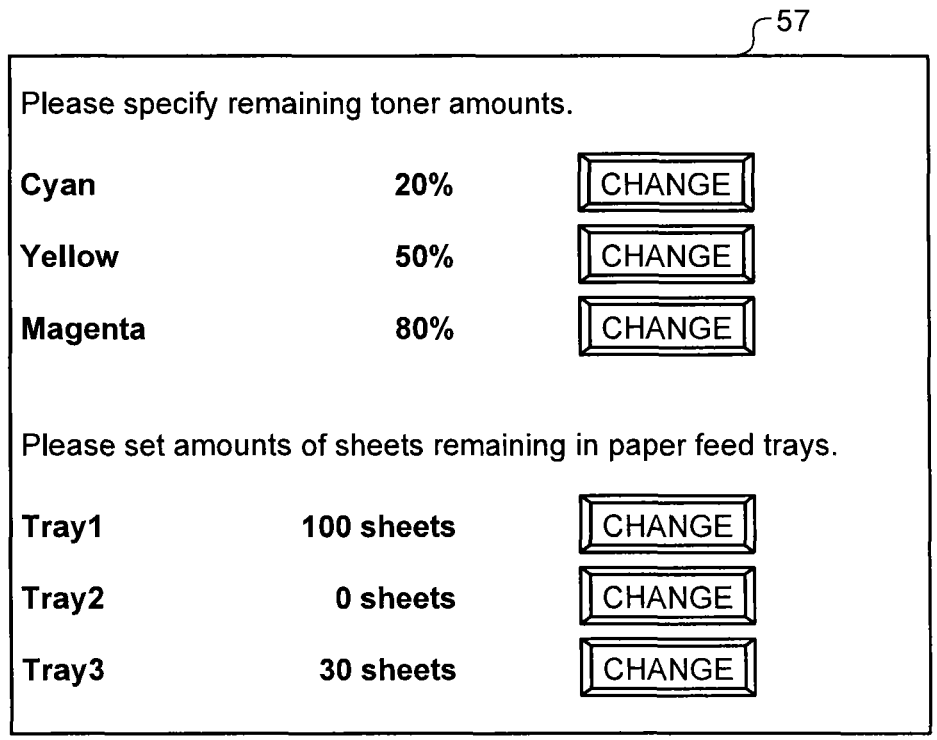
FIG. 9 is a diagram showing an example of an emulator operation UI displayed on the app developing apparatus.

At Step S9, the display control unit 65 generates, for example, an "emulator operation UI" as shown in FIG. 9 on the basis of the model of engine selected by the third vender and control information (CTL information), and displays (draws) the generated emulator operation UI on the display unit 57. Incidentally, the engine and the CTL information can be acquired through an API for the model to perform emulation. For example, when the model A is a device capable of color printing and has three paper feed trays as standard, items for setting remaining toner amounts of magenta toner, cyan toner, yellow toner, and black toner and items for setting the number of sheets remaining in the first to third paper feed trays are displayed on the emulator operation UI. When the model A is a device for black-and-white printing only and has two paper feed trays, only an item for black is displayed as an item for setting remaining toner amount, and only the first and second paper feed trays are displayed as paper feed trays that the number of sheets remaining therein can be set.

Furthermore, at Step S9, the connection establishing unit 68 establishes a connection to the model of real machine 1 selected by the third vendor, a virtual real machine 4 the selected model has been virtualized, and the model-API implementing unit 5 through the communication I/F 55. Incidentally, the term "establishment of a connection" here means that the connection establishing unit 68 puts the app developing apparatus 3 in a fit state to perform some kind of communication with the model of real machine 1 selected by the third vender, the virtual real machine 4 that the selected model has been virtualized, and the model-API implementing unit 5. Specifically, the connection establishing unit 68 can store therein IP addresses of the model of real machine 1 selected by the third vender, the virtual real machine 4 that the selected model has been virtualized, and the model-API implementing unit 5. Furthermore, the connection establishing unit 68 can establish communication lines between the model of real machine 1 selected by the third vender, the virtual real machine 4 that the selected model has been virtualized, and the model-API implementing unit 5 and the app developing apparatus 3 through the communication I/F 55.

The establishment of a connection is performed to notify Hook modules (reference numeral 78 in FIG. 13, reference numeral 86 in FIG. 15) of the real machine 1, the virtual real machine 4, and the model-API implementing unit 5, when the setting is changed through the emulator operation UI, of content of the change. Furthermore, the establishment of a connection is performed to notify the third vendor, when a device to which a communication connection has been established has been powered off, that the device cannot emulate. Incidentally, the Hook module is an example of an operation control unit, and, as will be described later, causes a model-dependent emulator to run according to contents of the setting of an API for model-dependent processing.

Here, a processing procedure when the setting of an emulator has been changed is as follows. The third vendor changes the setting of the emulator through the emulator operation UI. Contents of the changed setting is notified to the Hook modules (reference numeral 78 in FIG. 13, reference numeral 86 in FIG. 15) of the connected real machine 1, virtual real machine 4, and model-API implementing unit 5, and is stored in the Hook modules.

Next, when the connection has been established, a preparation for using an emulator for each model is complete. As will be described later in detail, at Step S10, the CPU 51 of the app developing apparatus 3 performs emulator control according to an operation by the third vendor, thereby performing verification of the operation of the developing application 9. Then, at Step S11, when an emulation exit operation has been detected, the process shown in the flowchart of FIG. 7 is terminated.

Figure 10:
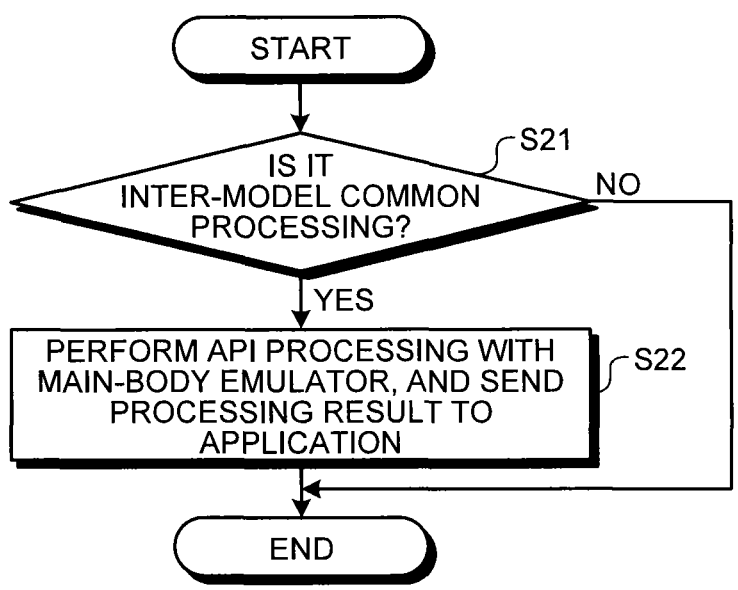
FIG. 10 is a flowchart showing the flow of an operation verifying process performed when an API called from a developing application is "inter-model common processing"

Subsequently, there is explained an operation verifying process performed when an API called from a developing application is "inter-model common processing". FIG. 10 is a flowchart showing the flow of the operation verifying process performed when an API called from the developing application 9 is "inter-model common processing". When an API has been called from the developing application 9 being subjected to verification of the operation by the third vendor, at Step S21, the processing judging unit 64 judges a type of the called API. When the processing judging unit 64 has judged that the API called from the developing application 9 is not "inter-model common processing", the process shown in the flowchart of FIG. 10 is terminated.

Figure 11:
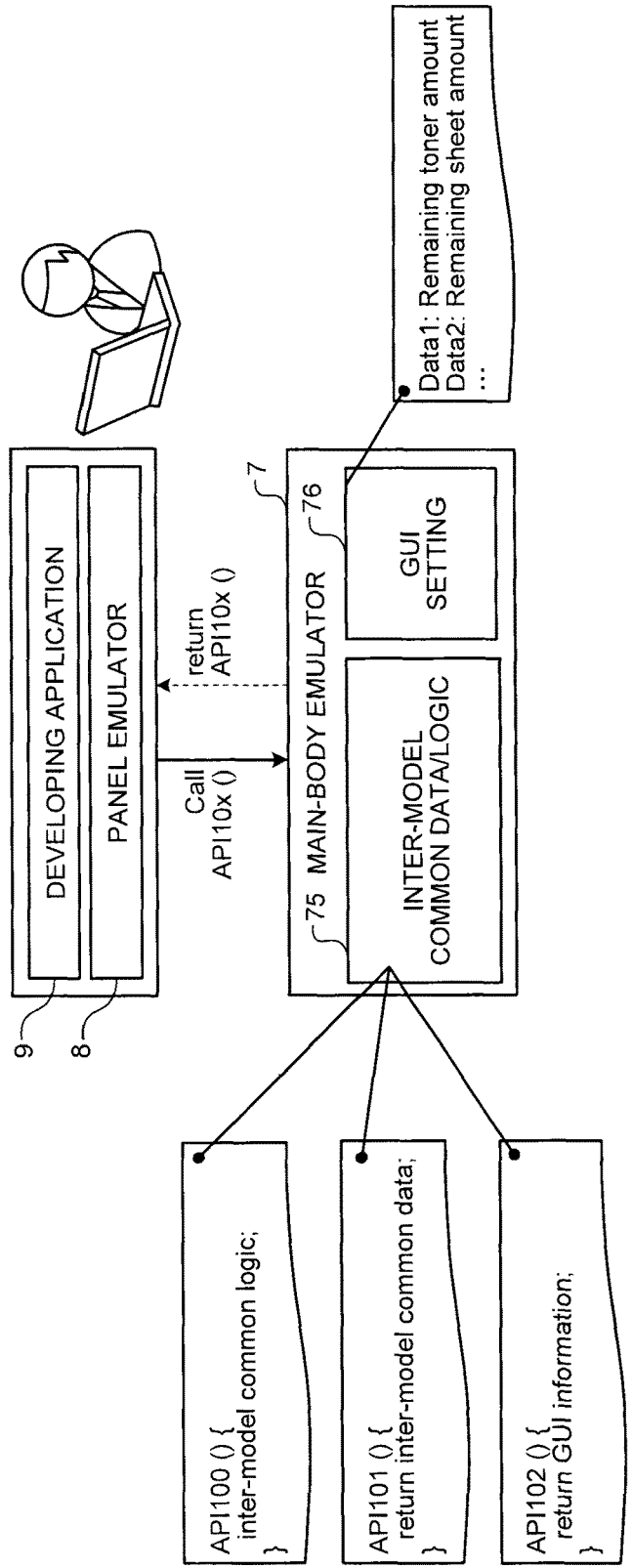
FIG. 11 is a diagram schematically showing the operation of the app development system when the API called from the developing application is "inter-model common processing"

On the other hand, when the processing judging unit 64 has judged that the API called from the developing application 9 is "inter-model common processing", the process moves on to Step S22. At Step S22, the common processing unit 70 performs verification of the operation of the API of "inter-model common processing" by using an inter-model common data/logic function 75 and a GUI setting function 76 of the main-body emulator 7 as shown in FIG. 11. Then, the common processing unit 70 sends a result of the operation verification to the developing application 9 through the panel emulator 8, and the process shown in the flowchart of FIG. 10 is terminated.

Figure 12:
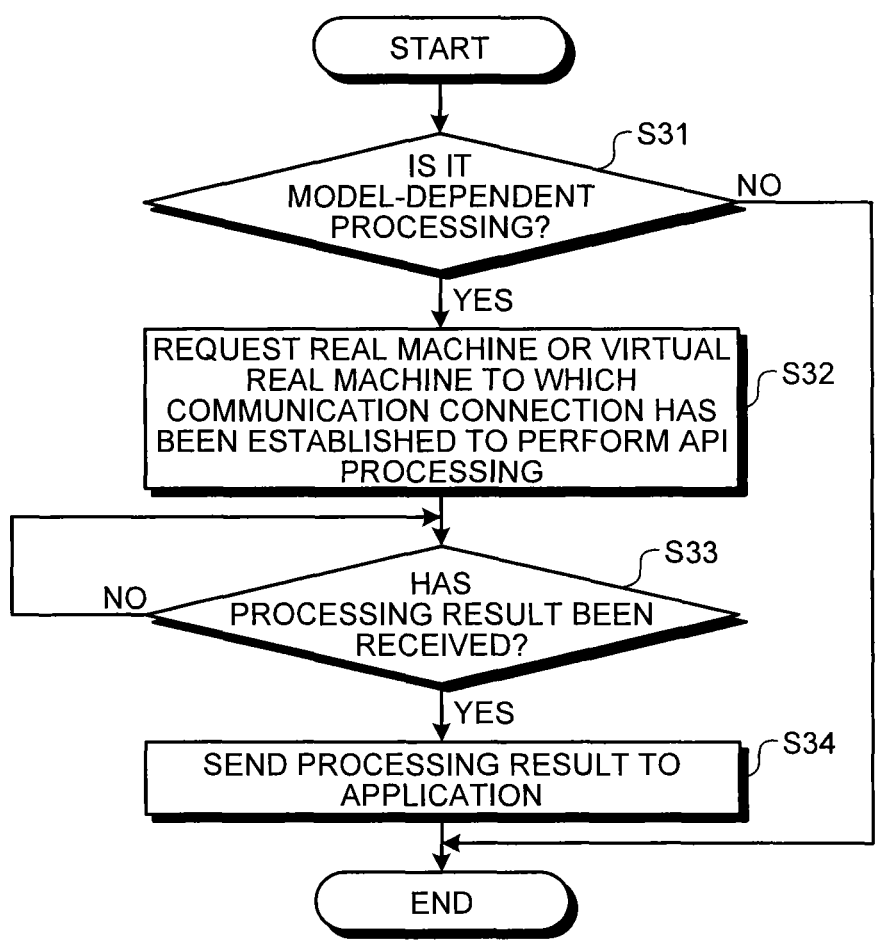
FIG. 12 is a flowchart showing the flow of an operation verifying process performed when an API called from the developing application is "model-dependent processing"

Subsequently, FIG. 12 is a flowchart showing the flow of an operation verifying process performed when an API called from the developing application is "model-dependent processing" which is processing specific to each model. When an API has been called from the developing application 9 being subjected to verification of the operation by the third vendor, at Step S31, the processing judging unit 64 judges a type of the called API. When the processing judging unit 64 has judged that the API called from the developing application 9 is not "model-dependent processing", the process shown in the flowchart of FIG. 12 is terminated.

On the other hand, when the processing judging unit 64 has judged that the API called from the developing application 9 is "model-dependent processing", the process moves on to Step S32. For example, when the API called from the developing application 9 is an image processing function specific to the model A and is difficult to be processed by an image processing function of the model B, and the model C has no image processing function, the processing judging unit 64 judges that the called API is "model-dependent processing".

At Step S32, the processing requesting unit 66 requests a real machine 1 or virtual real machine 4 to which a connection has been established in advance as described above and the called API corresponds to perform verification of the operation of a specific image engine API corresponding to the called API. That is, in the case of the above-described example, the processing requesting unit 66 requests the model A of real machine 1 or the virtual real machine 4 of the model A to perform verification of the operation of a specific image engine API corresponding to the called API. The requested model A of real machine 1 or the requested virtual real machine 4 of the model A performs verification of the operation corresponding to the image engine API.

Figure 13:
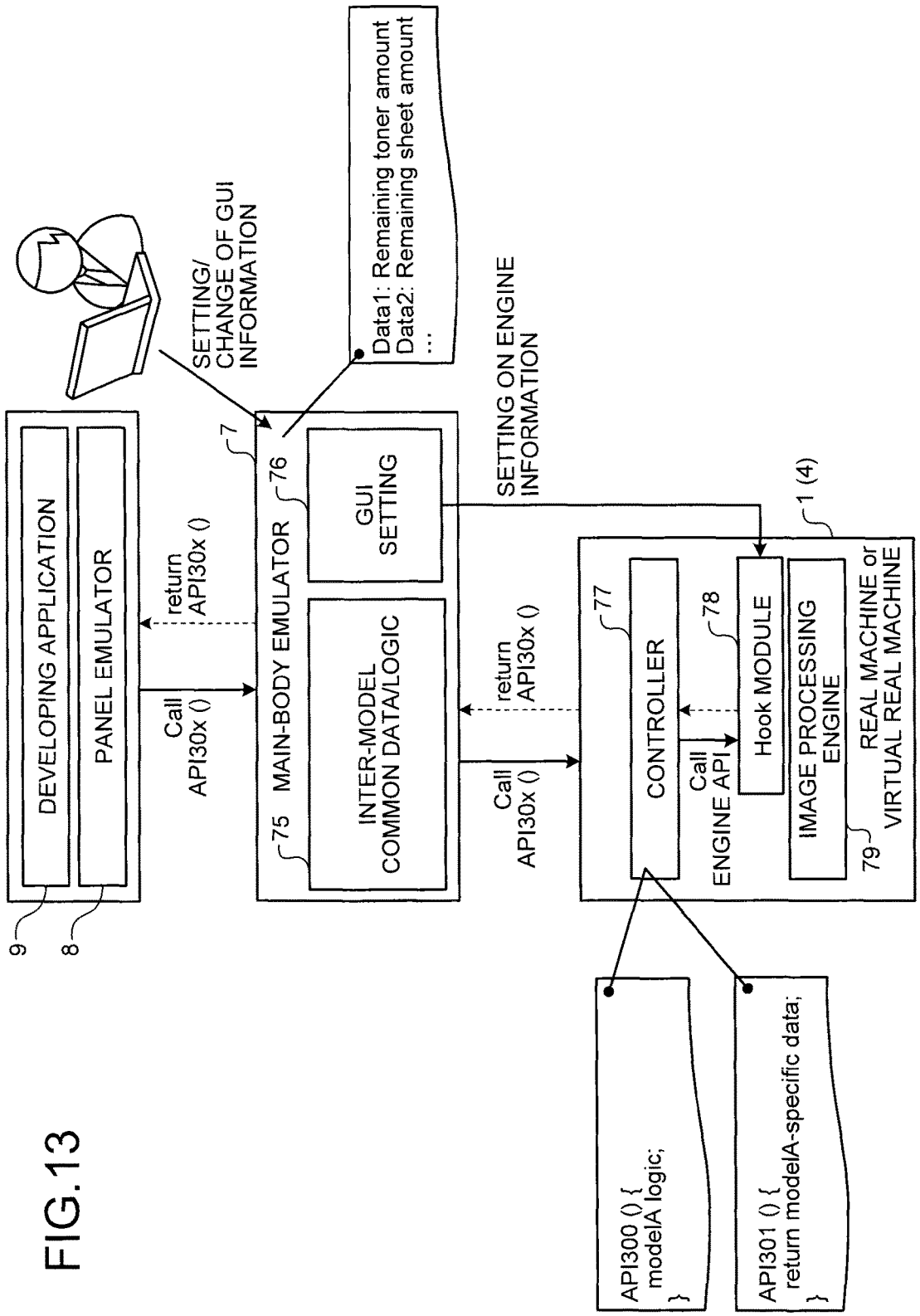
FIG. 13 is a diagram schematically showing the operation of the app development system when the API called from the developing application is "model-dependent processing"

Specifically, the real machine 1 or the virtual real machine 4 performs the process by issuing a command to an image processing engine 79 through an image processing engine API. At this time, setting contents set by the third vendor is used through the emulator operation UI as described above. For example, when toner remaining amount=0 has been set through the emulator operation UI, even if an amount of remaining toner in the real machine 1 is not zero, a controller 77 of the real machine 1 or virtual real machine 4 recognizes it as toner remaining amount=0 through the Hook module 78. Then, as shown in FIG. 13, the controller 77 of the real machine 1 or virtual real machine 4 sends a result of the operation verification according to toner remaining amount=0, such as printing failure as a result of the operation verification, to the app developing apparatus 3 via the network 6.

Incidentally, for example, in the case of a process of just sending information on a configuration of a model, logic of the process is common among the models, and only data to be transmitted is different. In such a case, the main-body emulator 7 can be configured to acquire information from the model in advance and perform processing in response to an API's call.

Next, at Step S33, it is determined whether the processing-result receiving unit 69 has received a result of the operation verification from the real machine 1 or virtual real machine 4 that has been requested to perform the verification of the operation. When it has been determined that the processing-result receiving unit 69 has received a result of the operation verification (YES at Step S33), the process moves on to Step S34. At Step S34, the processing-result receiving unit 69 sends the result of the operation verification to the developing application 9 through the main-body emulator 7 as shown in FIG. 13. Accordingly, the process shown in the flowchart of FIG. 12 is terminated.

Subsequently, FIG. 14 is a flowchart showing the flow of an operation verifying process performed when an API called from the developing application is mixture of "inter-model common processing" and "model-dependent processing". When an API has been called from the developing application 9 being subjected to verification of the operation by the third vendor, at Step S41, the processing judging unit 64 judges a type of the called API. When the processing judging unit 64 has judged that the API called from the developing application 9 is "inter-model common processing" or "model-dependent processing", the process shown in the flowchart of FIG. 14 is terminated.

On the other hand, when the processing judging unit 64 has judged that the API called from the developing application 9 is mixture of "inter-model common processing" and "model-dependent processing" the process moves on to Step S42. The following is an example of comments and source code of a program for controlling the processing judging unit 64 to judge the type of the called API as mixed processing.

//API400 partially includes model-dependent processing, and part of processing is dependent on model B

```
API400( ){
        inter-model common processing( );
        if (modelA){
                API400_modelA logic( );
        }else if{
                API400_modelB logic( );
        }
        inter-model common processing( );
}
```

Next, at Step S42, the processing judging unit 64 judges whether the API which is currently going to perform verification of the operation is an API of "inter-model common processing". When the processing judging unit 64 has judged that it is an API of "inter-model common processing" (YES at Step S42), the process moves on to Step S47. At Step S47, the common processing unit 70 performs verification of the operation of the API of "inter-model common processing", and sends a result of the operation verification to the developing application 9 through the panel emulator 8.

On the other hand, at Step S42, when the processing judging unit 64 has judged that it is not an API of "inter-model common processing" (NO at Step S42), the process moves on to Step S43. At Step S43, the processing judging unit 64 judges whether the API which is currently going to perform verification of the operation is an API of "model-dependent processing". When the processing judging unit 64 has judged that the API which is currently going to perform verification of the operation is not an API of "model-dependent processing", the process returns to Step S42. On the other hand, when the processing judging unit 64 has judged that the API which is currently going to perform verification of the operation is an API of "model-dependent processing", the process moves on to Step S44.

At Step S44, the processing requesting unit 66 requests the model-API implementing unit 5 to which a connection has been established as described above to perform verification of the operation of the API. For example, when the model to which a connection has been established is the model B, the processing requesting unit 66 requests the model-API implementing unit 5 to perform verification of the operation at the timing of processing API400_modelB logic() which is the API of "model-dependent processing".

Specifically, as shown in FIG. 15, the model-API implementing unit 5 acquires contents of the setting set by the third vendor through the emulator operation UI via the Hook module 86. Then, as shown in FIG. 15, the model-API implementing unit 5 performs verification of the operation of API for development 85 (=the above-described API of "model-dependent processing") which is being developed by the third vendor according to the acquired contents of the setting, and sends a result of the operation verification to the developing application 9 via the network 6 etc.

At Step S45, it is determined whether the processing-result receiving unit 69 has received a result of the verification of the operation of the API of "model-dependent processing" from the model-API implementing unit 5, and, when the processing-result receiving unit 69 has received a result of the operation verification (YES at Step S45), the process moves on to Step S46. Then, at Step S46, the processing-result receiving unit 69 sends the result of the verification of the operation of the API of "model-dependent processing" to the developing application 9 through the panel emulator 8 as shown in FIG. 15, and the process shown in the flowchart of FIG. 14 is terminated.

As is obvious from the above description, the app development system according to the embodiment implements only inter-model common processing in the main-body emulator 7 to be provided to an MFP application developer, such as a third vender, and provides the main-body emulator 7 promptly. On the other hand, model-dependent processing, which is processing specific to each model, is, after the main-body emulator 7 has been provided, implemented in an MFP (a real machine 1), a virtual real machine 4, and the model-API implementing unit 5 which are installed, for example, on a network in the same segment or on a so-called cloud computing type cloud (server group) which provides services via the network 6.

When an API called from the developing application 9 being developed by the third vender is inter-model common processing, the main-body emulator 7 provided from the third vender performs verification of the operation and sends a result of the operation verification to the developing application 9. On the other hand, when an API called from the developing application 9 being developed by the third vender is model-dependent processing, the main-body emulator 7 entrusts the verification of the operation of the API to the real machine 1, the virtual real machine 4, or the model-API implementing unit 5. Then, the main-body emulator 7 sends a result of the operation verification sent from the real machine 1, the virtual real machine 4, or the model-API implementing unit 5 to the developing application 9.

That is, verification of the operation is performed by sorting APIs for respective models into inter-model common processing and model-dependent processing separately. Accordingly, it is possible to eliminate a storage area in which emulators for the models are to be installed from a device on the third vendor side for which an application is being developed. Furthermore, it is possible to save the time and labor on the third vendor side for checking of the update of an emulator and for download and installation of a plug-in module, etc. which are required when each model is upgraded. Moreover, the third vendor side needs not to install an additional plug-in module. Therefore, it is possible to avoid such a disadvantage that the data size of the first installed emulator gradually increases due to an additionally-installed plug-in module in accordance with version upgrade of each model.

Furthermore, the manufacturer side, which provides emulators, provides an emulator corresponding to inter-model common processing to the third vendor promptly, and implements model-dependent processing in the real machine 1, the virtual real machine 4, and the model-API implementing unit 5 with every version upgrade. Accordingly, it is possible to provide an emulator corresponding to each model to the third vendor or the like more promptly. Also, it is possible to save the trouble of preparing a plug-in module for each model each time the model is upgraded.

Moreover, for example, a virtual real machine 4 that an MFP CTL system has been virtualized by virtualization software, such as VMware™ is about the same system as the MFP CTL system. Therefore, if the virtual real machine is provided to the third vendor, the manufacturer-side software resources may be leaked. However, in the case of the app development system according to the embodiment, the virtual real machine 4 is placed outside the segment, and the third vendor's action against the virtual real machine 4 is limited only to request the virtual real machine 4 to perform verification of the operation of an API specific to each model and to acquire a result of the operation verification. Therefore, it is possible to not only prevent leakage of software resources but also make the function of the virtual real machine 4 available.

For example, in the above description of the embodiment, the term "emulator" is used. However, other terms, such as "simulator", may be used for a device or function that executes the same processing as an emulator. The present invention can be applied to all devices or functions, etc. that perform verification of the operation of a program, such as an application, regardless of term (name).

According to the present invention, it is possible to cause an emulator to have a more prompt correspondence to model.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An information processing system comprising:
an information processing apparatus comprising circuitry configured to
    perform verification of operation of inter-model common processing common to multiple models of an emulated apparatus that performs at least one function, each of the multiple models of the emulated apparatus being configured to emulate operation of a corresponding distinct real machine that performs said at least one function, the inter-model common processing being included in an application, and send a result of the operation verification to the application, the verification of operation of the inter-model common processing being performed by an inter-model common emulator that realizes the operation common to the models of the emulated apparatus;
    request an external device to perform verification of operation of model-dependent processing included in the application, the model-dependent processing being different among the multiple models of the emulated apparatus, the verification of operation of the model-dependent processing being performed by a model-dependent emulator that realizes operation specific to each model of the emulated apparatus; and
    acquire a result of the verification of operation of the model-dependent processing from the external device, and send the result to the application.

2. The information processing system according to claim 1, wherein
the circuitry of the information processing apparatus is further configured to
    send an inquiry to plural external devices to determine whether it is possible to perform the verification of operation of the model-dependent processing;
    determine whether each external device of the plural external devices is capable of the verification of operation of the model-dependent processing from a result of the inquiry;
    display first list information of each external device determined to be capable of the verification of operation of the model-dependent processing on a display; and establish a communication connection to each external device determined to be capable of the verification of operation of the model-dependent processing, and the circuitry requests an external device selected from the first list information to perform the verification of operation of the model-dependent processing through the established communication connection.

3. The information processing system according to claim 2, wherein the circuitry notifies the selected external device of setting content of the model-dependent processing.

4. The information processing system according to claim 2, wherein in determining the at least one external device of the plural external devices capable of the verification of operation of the model-dependent processing, the circuitry determines that the at least one external device is able to connect to a communication line and that the at least one external device has been assigned a version number indicating that the version of the respective external device has been commercialized to be capable of the verification of operation of the model-dependent processing.

5. The information processing system according to claim 2, wherein the circuitry is further configured to acquire second list information indicating a list of model-dependent processing capabilities of external devices, wherein the circuitry compares first list information, which has been sent from each external device in response to the inquiry and includes model-dependent processing that the respective external device is able to perform verification of operation thereof, with the acquired second list information indicating the list of model-dependent processing capabilities of external devices, and, when all the model-dependent processing in the second list information is included in the model-dependent processing in the first list information of a respective external device, determines the respective external device to be capable of the verification of operation of the model-dependent processing.

6. A non-transitory computer-readable storage medium storing thereon a computer program product for being executed on a computer, causing the computer to perform a method comprising:

performing verification of operation of inter-model common processing common to multiple models of an emulated apparatus that performs at least one function, each of the multiple models of the emulated apparatus being configured to emulate operation of a corresponding distinct real machine that performs said at least one function, the inter-model common processing being included in an application, and sending a result of the operation verification to the application, the verification of operation of the inter-model common processing being performed by an inter-model common emulator that realizes the operation common to the models of the emulated apparatus;

requesting an external device to perform verification of operation of model-dependent processing included in the application, the model-dependent processing being different among the multiple models of the emulated apparatus, the verification of operation of the model-dependent processing being performed by a model-dependent emulator that realizes operation specific to each model of the emulated apparatus; and acquiring a result of the verification of operation of the model-dependent processing from the external device, and sending the result to the application.

7. The non-transitory computer-readable storage medium according to claim 6, further comprising:

sending an inquiry to plural external devices to determine whether it is possible to perform the verification of operation of the model-dependent processing;

determining whether each external device of the plural external devices is capable of the verification of operation of the model-dependent processing from a result of the inquiry;

displaying a first list of each external device determined to be capable of the verification of operation of the model-dependent processing on a display; and establishing a communication connection to each external device determined to be capable of the verification of operation of the model-dependent processing, wherein the requesting requests an external device selected from the first list to perform the verification of operation of the model-dependent processing through the established connection.

8. The non-transitory computer-readable storage medium according to claim 7, wherein the establishing notifies the selected external device of setting content of the model-dependent processing.

9. The non-transitory computer-readable storage medium according to claim 7, wherein the determining includes determining that the at least one external device is able to connect to a communication line and that the at least one external device has been assigned a version number indicating that the version of the respective external device has been commercialized to be capable of the verification of operation of the model-dependent processing.

10. The non-transitory computer-readable storage medium according to claim 7, further comprising acquiring second list information indicating a list of model-dependent processing capabilities of external devices, wherein the determining includes comparing first list information, which has been sent from each external device in response to the inquiry and includes model-dependent processing that the respective external device is able to perform verification of operation thereof, with the acquired second list information indicating the list of model-dependent processing capabilities of external devices, and, when all the model-dependent processing in the second list information is included in the model-dependent processing in the first list information of a respective external device, and determining the respective external device to be capable of the verification of operation of the model-dependent processing.

11. An information processing method comprising:

performing verification of operation of inter-model common processing common to multiple models of an emulated apparatus that performs at least one function, each of the multiple models of the emulated apparatus being configured to emulate operation of a corresponding distinct real machine that performs said at least one function, the inter-model common processing being included in an application, and sending a result of the operation verification to the application, the verification of operation of the inter-model common processing being performed by an inter-model common emulator that realizes the operation common to the models of the emulated apparatus;

requesting an external device to perform verification of operation of model-dependent processing included in the application, the model-dependent processing being different among the multiple models of the emulated apparatus, the verification of operation of the model-dependent processing being performed by a model-dependent emulator that realizes operation specific to each model of the emulated apparatus; and acquiring a result of the verification of operation of the model-dependent processing from the external device, and sending the result to the application.

12. The information processing method according to claim 11, further comprising:

sending an inquiry to plural external devices to determine whether it is possible to perform the verification of operation of the model-dependent processing;

determining whether each external device of the plural external devices is capable of the verification of operation of the model-dependent processing from a result of the inquiry;

displaying a first list information of each external device determined to be capable of the verification of operation of the model-dependent processing on a display; and establishing a communication connection to each external device determined to be capable of the verification of operation of the model-dependent processing, wherein the requesting includes requesting an external device selected from the first list information to perform the verification of operation of the model-dependent processing through the established communication connection.

13. The information processing method according to claim 12, wherein the establishing includes notifying the selected external device of setting content of the model-dependent processing.

14. The information processing method according to claim 12, wherein the determining includes determining that the at least one external device is able to connect to a communication line and that the at least one external device has been assigned a version number indicating that the version of the respective external device has been commercialized to be capable of the verification of operation of the model-dependent processing.

15. The information processing method according to claim 12, further comprising acquiring second list information indicating a list of model-dependent processing capabilities of external devices, wherein the determining includes comparing first list information, which has been sent from each external device in response to the inquiry and includes model-dependent processing that the respective external device is able to perform verification of operation thereof, with the acquired second list information indicating the list of model-dependent processing capabilities of external devices, and, when all the model-dependent processing in the second list information is included in the model-dependent processing in the first list information of a respective external device, determining the respective external device to be capable of the verification of operation of the model-dependent processing.

* * * * *